United States Patent [19]

Parker

[11] 4,073,341
[45] Feb. 14, 1978

[54] ACOUSTICALLY CONTROLLED SUBSURFACE SAFETY VALVE SYSTEM

[75] Inventor: William H. Parker, Hurst, Tex.

[73] Assignee: Del Norte Technology, Inc., Euless, Tex.

[21] Appl. No.: 682,196

[22] Filed: May 3, 1976

Related U.S. Application Data

[63] Continuation-in-part of Ser. No. 294,289, Oct. 2, 1972, Pat. No. 3,961,308, and Ser. No. 629,515, Nov. 6, 1975.

[51] Int. Cl.² .................. E21B 43/00; E21B 33/03
[52] U.S. Cl. .................................. 166/65 R; 166/72; 340/18 NC
[58] Field of Search .................. 166/72, 65 R, 117.5; 175/40, 48; 340/15.5 CC, 18 NC; 181/103, 105, 139; 33/307

[56] References Cited

U.S. PATENT DOCUMENTS

| | | | |
|---|---|---|---|
| 2,679,903 | 6/1954 | McGowen, Jr. et al. | 166/117.5 |
| 2,810,546 | 10/1957 | Eaton et al. | 166/72 |
| 3,115,774 | 12/1963 | Kolb | 175/40 |
| 3,739,845 | 6/1973 | Berry et al. | 166/72 |
| 3,741,303 | 6/1973 | Terral | 166/214 |
| 3,790,930 | 2/1974 | Lamel et al. | 175/40 |
| 3,799,259 | 3/1974 | Dinning | 166/117.5 |
| 3,850,237 | 11/1974 | Ahlstone et al. | 166/72 |

Primary Examiner—James A. Leppink

[57] ABSTRACT

An acoustically controlled system includes means for transmitting any of several different forms of sonic energy signals through the walls of a tubing extending down into a gas or oil well. There, any of several functions may be performed, such as a control of a disaster valve located at the lower end of the tubing. Depending upon the function selected, the valve may hold itself open irrespective of the continuity of the sonic signal, or may slam shut if the sonic energy ends. Preferably, the selection control depends upon the pulse repetition rate of the sonic energy pulses.

15 Claims, 14 Drawing Figures

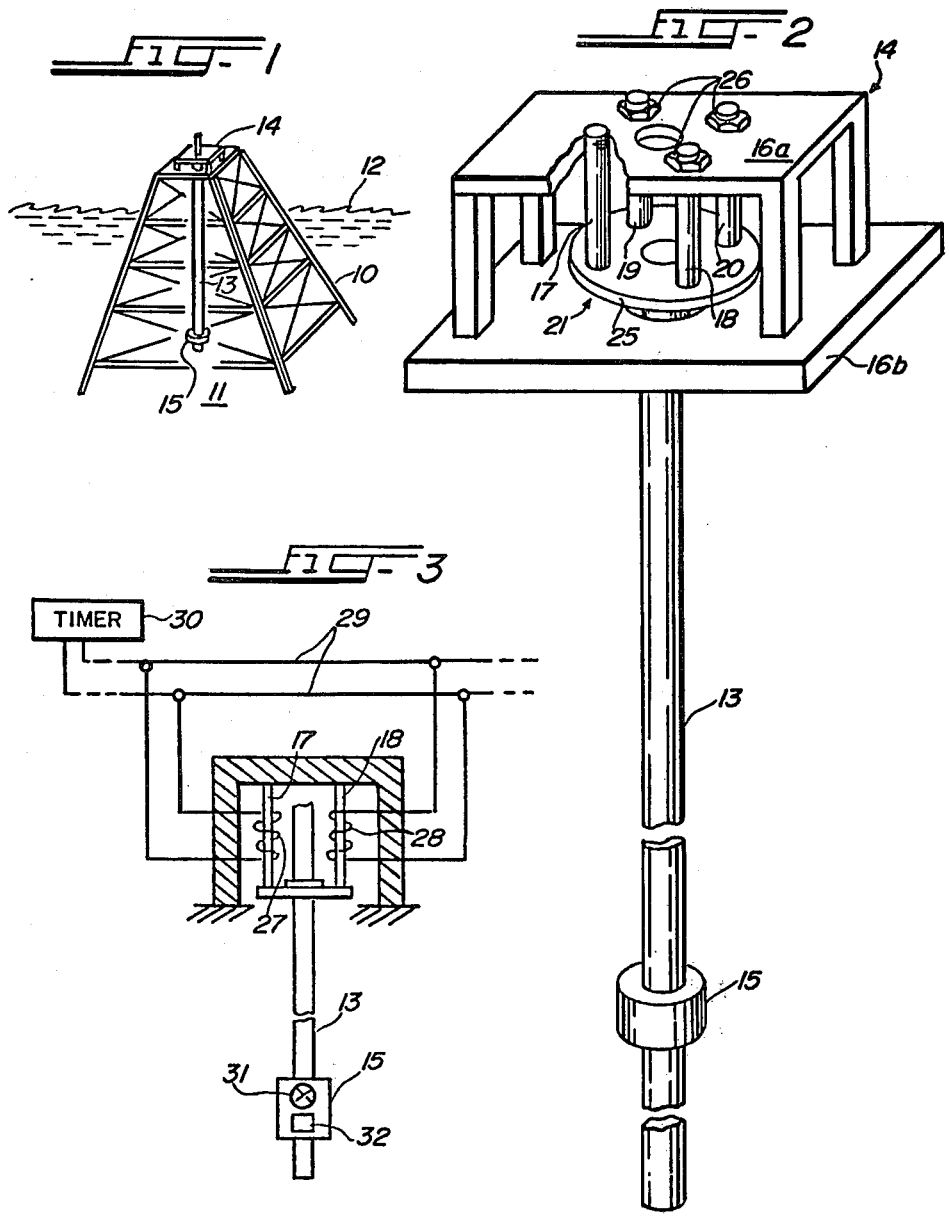

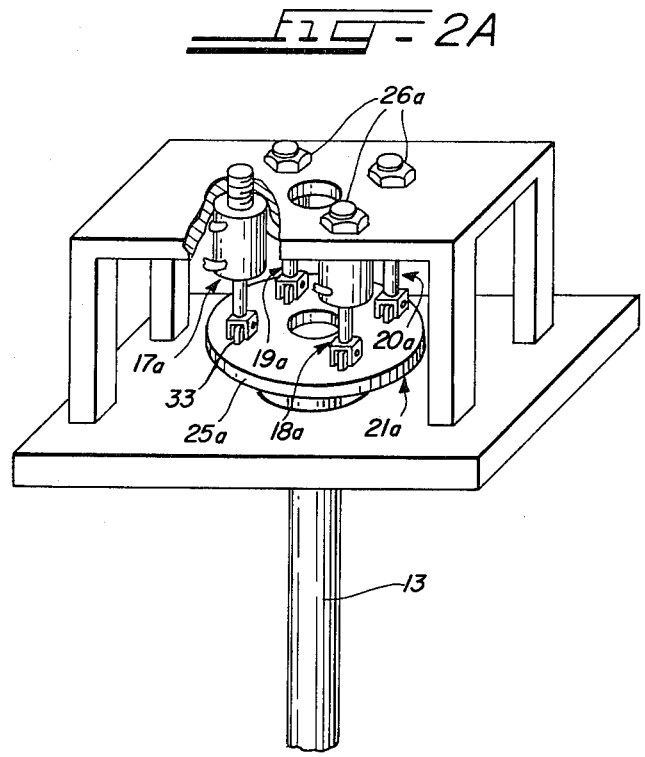
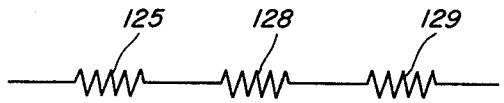
| | | |
|---|---|---|
| A | VERTICAL SIGNAL | |
| B | VERTICAL GATE 142 | |
| C | HORIZONTAL SIGNAL | |
| D | HORIZONTAL GATE 144 | |

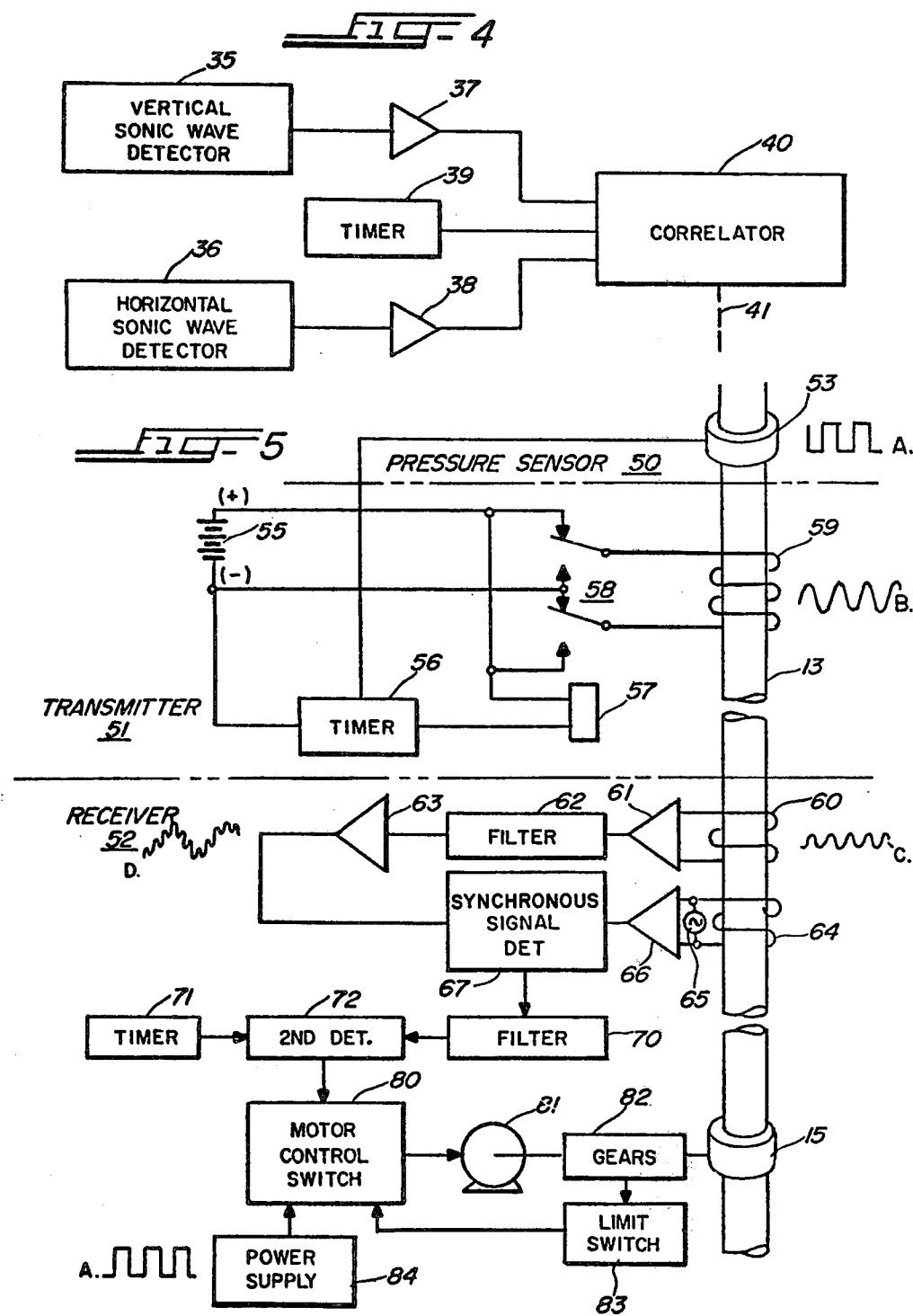

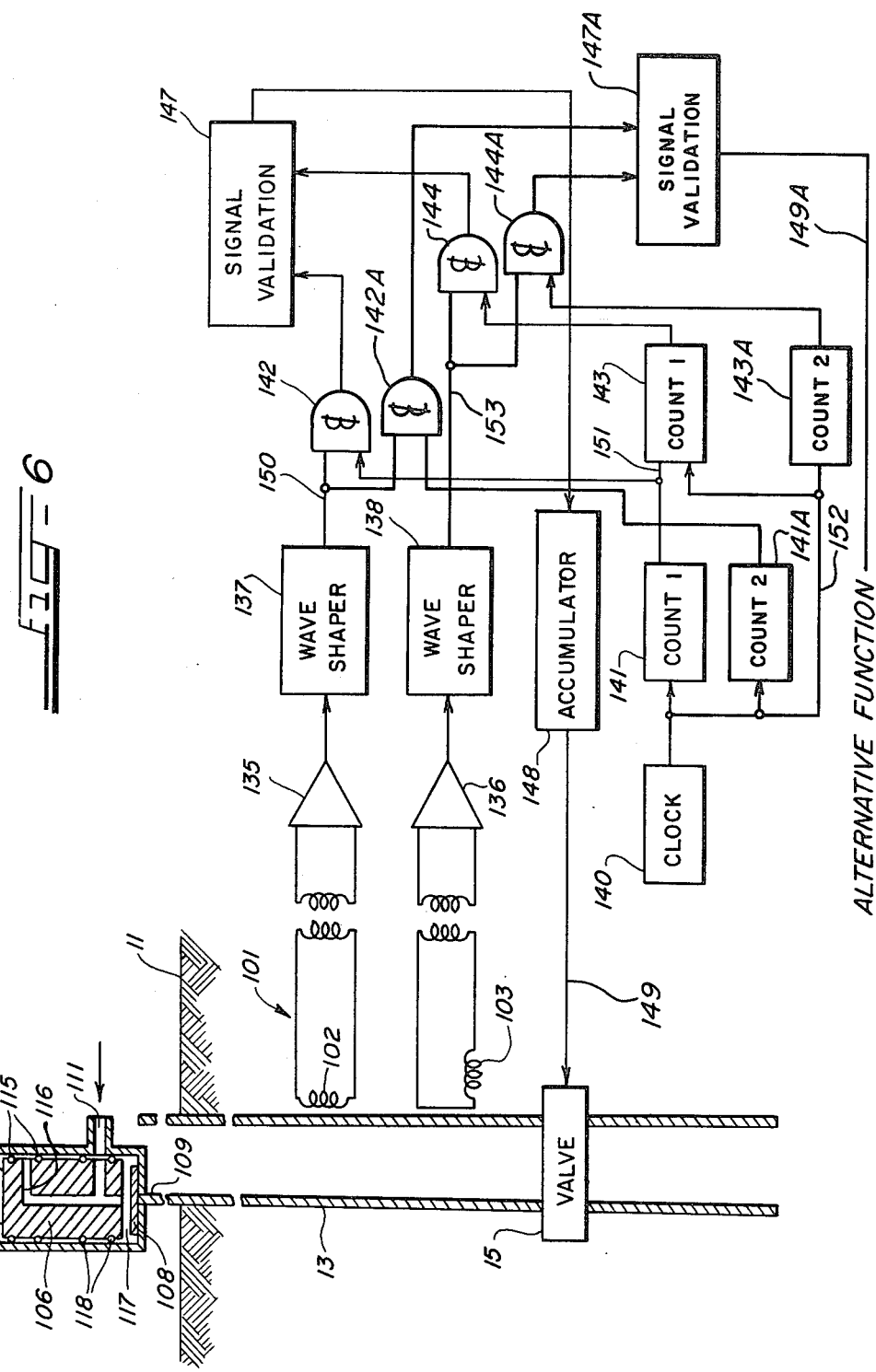

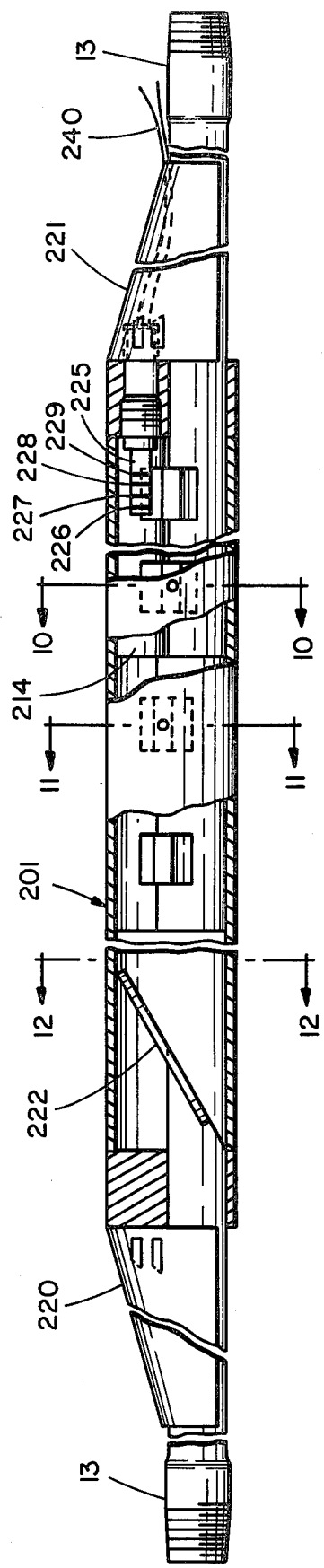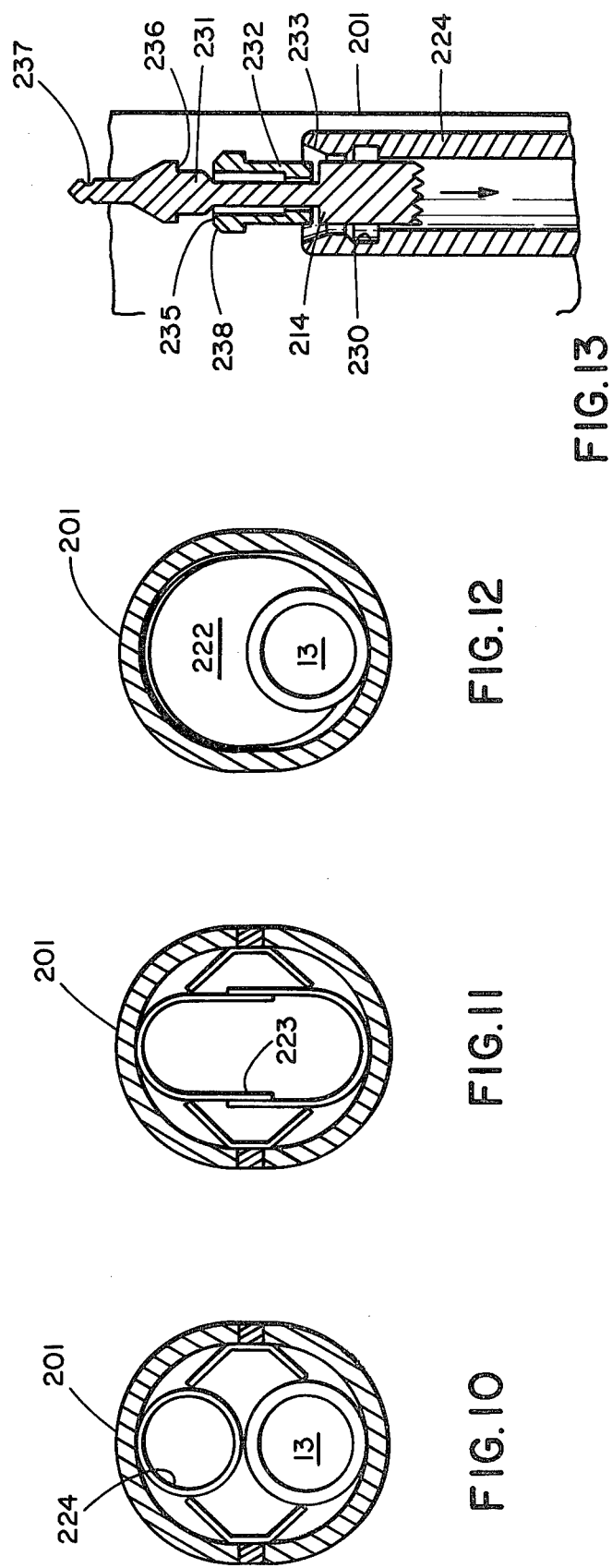

ACOUSTICALLY CONTROLLED SUBSURFACE SAFETY VALVE SYSTEM

This is a continuation-in-part of my earlier copending patent applications, Ser. No. 294,289, filed Oct. 2, 1972, now U.S. Pat. No. 3,961,308, issued June 1, 1976, for Oil and Gas Well Disaster Valve Control System, and Ser. No. 629,515, filed Nov. 6, 1975, for Oil and Gas Well Disaster Valve Control System.

This invention relates to acoustically controlled systems, and especially to systems for controlling subsurface safety valves in oil and gas wells.

The problem of oil well outflow control has recently been a subject matter of great public concern. One reason for this concern is the widely publicized spills wherein underwater oil wells leak into the ocean. The crude oil flows to the ocean surface, kills wildlife, ruins beaches, and provokes public outcry. One solution to these and other comparable oil spill problems is to place a disaster valve over the mouth of the well. If there is a disaster or or runaway condition, the valve closes, and no oil or gas can thereafter leave the well.

The usual approach is to extend a communication line or duct down the pipe to control the valve. The line or duct might be hydraulic, pneumatic, or electric. One trouble is that the oil spill might be caused by a natural disaster, such as a storm, fire, or the like. If so, the line is very likely to be broken or otherwise rendered inoperative responsive to the same disaster that breaks the pipe leading to the spill. To overcome these problems, in some systems the duct was placed inside the pipe or tube. However, the installation and removal of this duct is troublesome, hinders cleanout, and it may become entangled in a manner which actually prevents the valve control.

Once a communication line is established, it is possible to perform a plurality of functions at or near the bottom of the well. For example, if a valve (which is spring biased to close) is normally held open against the bias, responsive to a continuous transmission of sonic energy down a tubing string, it may not be possible to perform necessary maintenance or repair without shutting down the well. Hence, it may sometimes be desirable to override the automatically closing safety valve feature. Likewise, there are occasions other than safety valve control when communication down the tubing string of a well may be necessary or desirable.

Still another consideration relates to the operating depth of a downhole communication system. On the average, the communication should have a range of perhaps 1 to 4000 feet. However, it should also be obvious that sometimes a well may be very shallow, say, a hundred feet, and other times it may be much deeper than 4000 feet. Hence, the communication system should be able to operate efficiently over an extremely wide range of depths. Moreover, it should be possible to service, repair or replace all parts of the downhole communication system without having to pull up the tubing.

Accordingly, there is a need for a fail-safe system and for a method of controlling devices, such as disaster valves, at the bottom of a well. The system should function equally well without regard to the depth or location of the well or whether the valve is remotely located, far down inside a borehole, or deep under the sea.

Therefore, an object of the invention is to provide a new and improved sonic energy system for communicating downhole to the bottom of an oil pipe line. Here an object is to provide a fail-safe method of such communication, with means for exercising a control at the bottom of a line, even if the pipe line is completely broken and all communication is lost between the bottom and the top of the well.

Yet another object of the invention is to eliminate the need for lifting a pipe line in order to service parts of the system. Here an object is to provide means for lowering a device into a deep hole and for there connecting it in place.

Another object of the invention is to improve maintenance and to reduce costs by eliminating expensive maintenance requirements.

In keeping with an aspect of this invention, the walls of the oil or gas well tubing are used as a sonic energy, communication line to transmit signals to a device at the bottom of the tubing. Various devices are distributed along the length of the tubing to provide important system functions. Each of these devices which includes serviceable or consumable parts is arranged so that it can be serviced, at least in a first order of maintenance, from the top of the tubing string.

The nature of these embodiments may become more apparent from a study of the attached drawings wherein:

FIG. 1 schematically shows an exemplary off-shore oil well tower with tubing extending down to a disaster valve at or, preferably, below the ocean floor;

FIG. 2 is a schematic and perspective view of the pertinent parts of the tower of FIG. 1, showing an embodiment employing an acoustic signal;

FIG. 2A is a perspective view, similar to the view of FIG. 2, which shows a second embodiment of an acoustic signal device;

FIG. 3 is a schematic showing of the electrical transducer element used in FIG. 2;

FIG. 4 is a block diagram of a detector circuit at the bottom of the well which is used to detect the acoustic signal generated by the devices of FIG. 2 and FIG. 2A;

FIG. 5 is a combined showing of an oil well pipe or tubing and a block diagram of a second embodiment using an electrical system for controlling a disaster valve at the bottom of the well;

FIG. 6 is a schematic and block diagram of a third, and preferred, embodiment of the invention using a tuned hammer for transmitting acoustic energy through the tubing wall;

FIG. 7 is a series of wave forms which are useful for explaining the operation of the circuit of FIG. 6;

FIG. 9 is a detailed view of a side pocket mandrel used in the line of FIG. 8;

FIGS. 10-12 are cross sections of the side pocket mandrel, taken along lines 10—10, 11—11, and 12—12, respectively, of FIG. 9; and FIG. 13 is a schematic showing of a module landing in a side pocket mandrel used in the oil line tubing.

Figure 8:
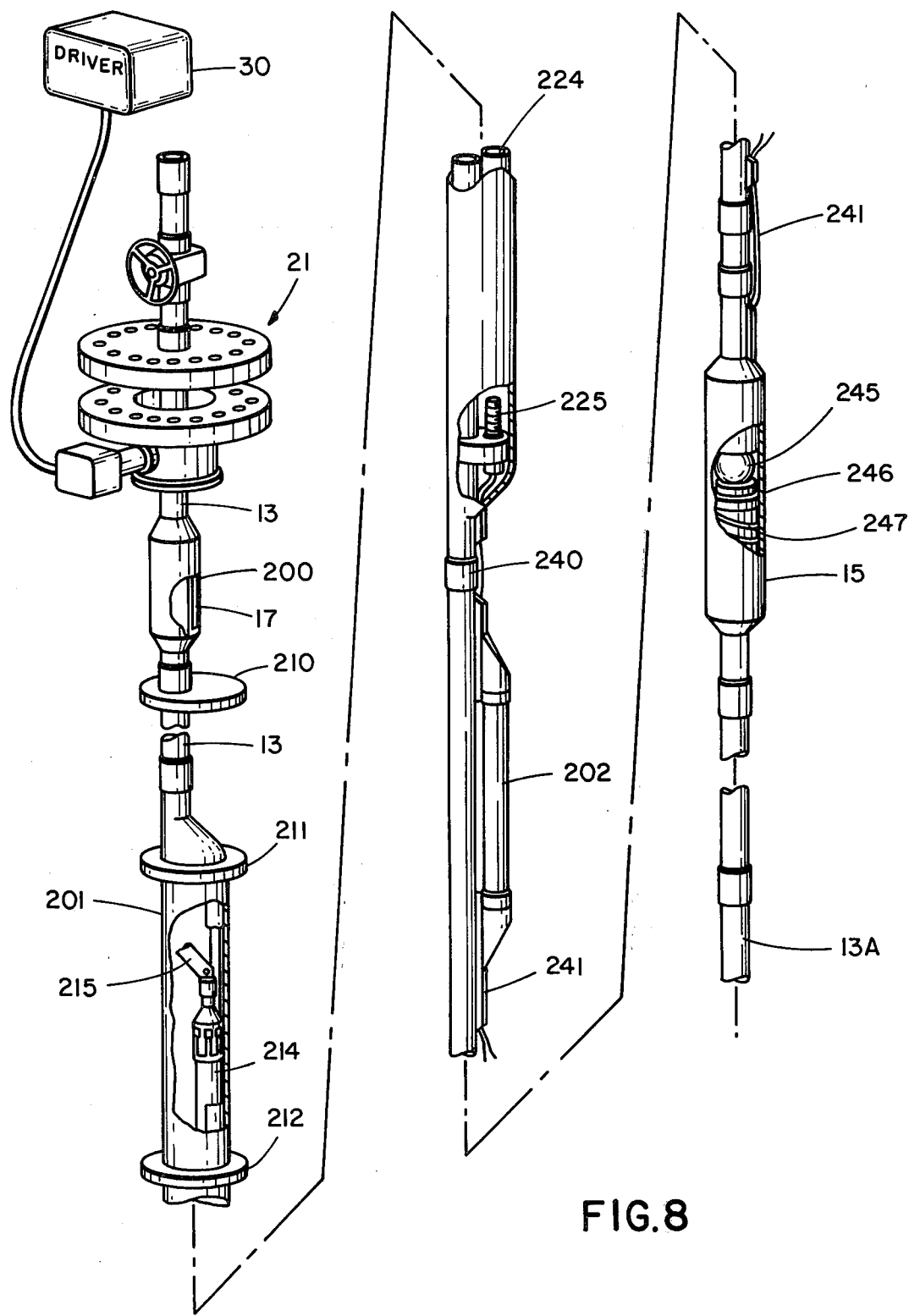
FIG. 8 is a perspective view of an oil or gas line, including various devices which are distributed along the length of the line.

By way of example, FIG. 1 shows an oil or gas well tower 10 resting on the ocean floor 11 with the top 14 projecting above the surface 12 of the ocean. Actually, the surface 12 is intended as a generic disclosure of any convenient point on or near the surface of the earth without regard as to whether such surface is covered by water or land. A pipe or tubing 13 begins at the top of tower 14, which is at or near the surface of the earth.

The pipe extends vertically downward, through the tower structure 10 to a remote location, such as the ocean floor 11. Control equipment on the top 14 of the tower controls the pumping and flow of the oil or gas through the tubing 13. On the bottom end of the tubing 13, a disaster valve 15 is adapted to close in order to shut down the flow of oil or gas.

This showing of an off-shore tower 10 is symbolically exemplary of almost any well drilling and pumping equipment. Therefore, references hereinafter to towers, off-shore rigs, etc. are to be construed broadly enough to cover any and all suitable oil or gas conveying equipment. Some of the pipes and tubing may be many thousand feet long. Others may be longer or shorter.

The problem exemplified by this oil tower 10 is one of controlling disaster valve 15 responsive to control equipment located at the top 14 of the tower.

In FIG. 2, the tubing 13 may be a string of pipe or tubing sections extending downwardly from control equipment at tower 14, perhaps many thousands of feet, to a disaster valve 15. The sonic energy generating equipment includes a table-like structure 16a resting on a platform 16b supported by the tower structure. A group of magnetostrictive rods 17-20 are suspended from the top of the table. While four rods 17-20 are here shown, any suitable number of rods may be provided, such as four, six, eight, ten or more. Each rod may be made of nickel, perhaps an inch or so in diameter, and in the order of 4 feet long.

In a variation of this embodiment, the magnetostrictive rods of FIG. 2 are replaced by any other suitable means for raising and then dropping of the tubing string. For example, FIG. 2A shows that hydraulic rams 17a-20a may be used in place of the magnetostrictive rods 17-20.

The weight of tubing 13 hangs from these rods, rams, or the like, thereby tending to stretch or tension them. Since the lower end of the tubing 13 extends down into the earth and the upper end is hanging upon rods 17-20, rams 17a-20a, or the like, in an unrestrained manner, the intermediate tubing is free to move or stretch at least a few thousandths of an inch.

A transmitting transducer 21 is adapted to send sonic energy signals down the tubing 13. In greater detail, the top of the tubing 13 terminates in a flange 25 which is supported by the magnetostrictive rods 17-20, hydraulic rams 17a-20a, or the like. While any suitable attachment means may be used, the rods and rams are here shown as being threaded at their top ends. Large nuts 26 are turned onto the threaded ends. The bottom of the rods or rams are attached to flange 25 in any suitable manner, such as by shackles 33, for example.

A coil such as 27, 28 surrounds each of the magnetostrictive rods. Simultaneously, each coil is selectively energized or deenergized responsive to current in a common circuit 29. The coils are electrically insulated wire wrapped —in the magnetic sense — in a series aiding manner. For the rams, a suitable common hydraulic conduit or control device is provided.

A driver or timer 30 energizes the common circuit wires 29 or pressurizes equivalent hydraulic lines, at accurately timed intervals. The resulting electrical currents create magnetic fields in the magnetostrictive rods 17-20 which cause them to contract or shrink, or hydraulic pressure retracts the rams, and lifts or stretches the tube. When the driver or timer 30 removes the electrical signal from the wires 29, or the pressure from the hydraulic line, the magnetic field collapses in the magnetostrictive rods, or the rams extend. Responsive thereto, the rods or rams lengthen and the tubing 13 is released. This stretching and relaxing of the tubing 13 transmits pings or pulses of acoustic energy down the pipe walls.

It should be obvious that means, other than the magnetostrictive rods or hydraulic rams, may be used to transmit the sonic energy.

The pulses of sonic energy travel down the tube walls at a fixed velocity and with a known transmission characteristic, which depends upon the material used to make the tubing. The principal energy travels in a compression or p-wave mode. As the energy travels, transverse vibrations occur to cause a second sonic wave front travelling in the tubing at a slower velocity. Therefore, each sonic energy pulse transmitted responsive to the output of driver or timer 30 arrives at the bottom of the tubing in the form of two sonic energy pulses (herein called vertical and horizontal energy) displaced from each other in time by a predetermined period of time. Random noise may be distinguished since it will not occur with the same predictable timing differential.

Means are provided at the bottom of the tubing for detecting the sonic energy pulses transmitted from the top of the tubing. In greater detail, the disaster valve 15 comprises a mechanical valve 31 for shutting down the flow of oil or gas from the well and an electronic control package 32 for selectively opening and closing the valve.

The electronic package 32 is constructed, as shown by the block diagram in FIG. 4, and supported as shown in FIG. 8. More specifically, a first receiving transducer 35 (FIG. 4) detects the prinicipal vertical compression or p-wave of sonic energy travelling down the tubing as a direct result of the ping of acoustic energy developed when the tube is stretched and relaxed. A second receiving transducer 36 detects the secondary horizontal or transverse wave of sonic energy travelling down the tube. The outputs of these two detectors are amplified at 37, 38.

A local timer operates at a pulse repetition rate which is a function of the pulse repetition rate of the driver or timer 30, thereby providing an axis of reference. Preferably, the timer 39 locks into self-synchronism responsive to the timing of uniformly spaced pulses received down the tubing. A correlator 40 compares the outputs of the timer 39 and of the two receiving transducers 35, 36.

Noise in the tubing wall will not have any fixed relationship to the system timing. Thus, noise does not coincide with enable periods established by the timer 39, to repeatedly enable the system to receive energy at the intervals fixed by the timer 30. The natural resonance of the described system may be put at about 2,000 Hz, which does not match any other source of acoustic energy in an oil or gas field. Therefore, timer 39 will not lock into synchronism with random noise or with vibrations caused by pumps, drills, or the like. It is extremely unlikely that random noise could cause the correlator 40 to receive successive vertical and horizontal signals which compare with the system signals since the signals must emanate from a point which is the exact distance away from the gate so that the signal will reach the gate at the correct time and with the standard time intervals. Hence, noise is rejected. To further promote noise isolation, the correlator has an electronic gate which closes between timer pulses to preclude response to any signals received between standard time intervals.

As long as sonic energy pulses continue to travel down the tubing at fixed intervals, the correlator output at 41 holds the valve 31 open. If the transmitting transducer (rods 17–20, coils 27, 28, and wires 29 or hydraulic rams 17a–20a, and their controls) ceases to transmit sonic energy to the disaster valve 15, it shuts automatically, often under a spring bias.

Therefore, even if the tubing should break into tiny pieces, the valve 31 will shut. Moreover, if desired, the valve may be a spring loaded device which snaps shut when a power source is removed. Therefore, it is a fail-safe device. To further insure against faulty valve response, the circuit may be adjusted to require an accumulation of, perhaps, ten (for example) successive pulses before enabling the valve to open, but a loss of only two (for example) successive pulses to close the valve.

A similar system is shown in FIG. 5 except that the energy pulses are sent down the tubing 13 in the form of magnetic flux changes. The major elements of this electrical system are a pressure sensor system 50, a transmitter 51, and a receiver 52. The sensor 50 includes any suitable device 53 which responds to abnormal pressure changes — either too low or too high, as desired. In its simplest form, this sensor could be an oil pressure gauge which gives signals when the "needle" moves out of a predetermined zone. Other and preferred devices are known to those who are skilled in the art.

The transmitter 51 comprises a source 55 of D.C. power, a timer 56, a relay 57, polarity reversing contacts 58, and a primary winding 59 on the tubing 13. The timer 56 may operate at about 3 Hz, for example. The primary winding 59 may have in the order of 400 to 1,000 turns.

As long as the sensor 53 detects normal oil or gas pressure in tubing 13, the timer 56 operates to send periodic control signals to relay 57. When relay 57 is released, the top of primary winding 59 is positive (+) and the bottom is negative (−). When relay 57 is operated, these polarities are reversed so that the top of the primary winding 59 is negative (−) and the bottom is positive (+). Thus, a square wave signal A appears in primary winding 59.

The walls of tubing 13 function as the core of a transformer functions. Therefore, a reversing D.C. signal A in primary winding 59 causes an A.C. signal B to be induced in secondary windings by the core flux changes.

The receiver 52 comprises a secondary transformer winding 60 which acts as a detector coil for the flux changes. This winding may have approximately 10,000 turns. The winding is connected to drive, in cascade, amplifier 61, a filter 62, and a second amplifier 63.

Another secondary winding 64 on the tubing core 13 is driven by an oscillator 65 at a predetermined frequency (signal C), such as 200 Hz. This same 200 Hz signal is also applied through an amplifier 66 to a synchronizing signal detector 67. In the tubing core 13, the 3 Hz flux changes sent down the well tubing 13 mix and combine with the 200 Hz flux changes generated locally to produce signal D. The 3 Hz changes may be transmitted over greater distances. The 200 Hz changes are easier to amplify and process electronically. They avoid reciprocal frequency problems (1/F) inherent in low frequency amplifiers. Therefore, the signal D passing through filter 62 is a combination of wave forms B and C, having a frequency in the order of 195 Hz to 205 Hz. This signal is applied to the other side of the synchronism signal detector 67.

The locally generated 200 Hz signal is cancelled in the detector 67 so that only the 3 Hz signal is transmitted to the filter 70. A locally operated timer 71 has a synchronized output which is a function of the output of the timer 56. Therefore, detector 72 gives an output signal when the signals of timer 71 and filter 70 coincide. The detector 72 may have any suitable form such as a narrow band locked-loop detector, which discriminates against unwanted frequencies.

A third and preferred embodiment of the invention is shown in FIGS. 6 and 7. Here, a tuned hammer 100 is mounted on the top of the tubing string 13 to vertically pound the tubing, and thereby transmit sonic energy through the tubing wall to the detectors 101 near the bottom of the tubing. These detectors may be any suitable vibration detectors, such as those conventionally known as geophones, for example. One geophone 102 detects the vertical component. The other geophone 103 detects the horizontal component.

The tuned hammer 100 comprises a closed housing 105 having a hammer 106 of known weight mounted therein for free and virtually unrestrained vertical motion. A spring 107 is positioned above the hammer to tune the system to have a known period determined by the weight of the hammer and the spring constant. The spring normally urges the hammer downwardly to the lowermost position where the bottom face 108 of hammer 106 rests on the top 109 of the tubing. Of course, the disclosure is schematic only, since the hammer pounding directly on the top of the tubing would tend to mushroom it. Therefore, the hammer will act upon suitable mechanical means for efficiently transmitting sonic energy through the tubing wall without damaging it.

The housing 105 has an inlet port 111 and an outlet port 112 for transmission of a fluid under pressure, such as a pneumatic or hydraulic fluid, or the like. More particularly, a gas is forced into the inlet port 111 under pressure. Two O-rings 115 seal the cylindrical periphery of the hammer 106 to the internal cylinder walls of housing 100, so that the gas cannot escape through an opening 116 extending inside and through the wall of the hammer 106. The gas does escape from hammer 106 and through an air passage 117 to expand under two O-rings 118, thereby lifting the hammer 106 against the force of spring 107.

As the pressurized air forces the hammer 106 upwardly, the orifice 116 comes into registry with the outlet port 112. The air pressure under the hammer is relieved. Therefore, the spring 107 forces the hammer downwardly, causing it to strike against the top of the tubing 13. Then, the stroke repeats.

The weight of the hammer 106, the constant of the spring 107, and the pressure of the air, all cooperate to tune the hammer so that its strokes recur at a regular and accurately predicted frequency.

The sonic energy thus generated in the tubing wall travels down the wall and resolves itself into vertical and horizontal components, as shown in FIG. 7A, 7B. More particularly, the vibrating line (as at 125) represents the vertical mode of a sonic energy pulse induced by one hammer stroke. The vibrating line 126 represents the horizontal mode of the same sonic energy pulse, induced by the same hammer stroke. The time difference 127 between these two modes is attributed to the sound energy transmission characteristics of the material which makes up the tubing wall. Therefore, the detector circuit may discriminate between random noise and hammer strokes by detecting vertical mode signals 125, 128, 129 which recur at the intervals of the tuned hammer strokes, with horizontal mode signals 126, 130, 131 lagging behind each vertical signal by the known and predictable time period 127. (Note that the system responds to the proper intervals between signals, as distinguished from a filter type device which responds to frequency.)

Briefly, the invention provides vertical and horizontal geophone type vibration sensors 102, 103, respectively. These sensors are connected to the inputs of amplifiers 135, 136, respectively, which raise the signal level to a standard input amplitude. The outputs of these amplifiers are connected to individually associated wave shapers 137, 138 which provide an output signal of a form that can trigger the AND gates 142, 144, if they are then enabled.

A free running clock 140 generates cyclically recurring pulses, with extreme accuracy. These clock pulses are counted by a counter 141 to measure the recurring, standard time interval between the signals 125, 128, 129 generated by the tuned hammer. After the count is completed by counter 141, the AND gate 142 is briefly enabled at its lower input, and thereafter the count is repeated. If a hammer signal is then present at the end of each count, the AND gate 142 is also enabled over wire 150, and it conducts. A second counter 143 is also triggered when the AND gate 142 is enabled. This counter 143 then counts clock pulses received over wire 152 and measures the time interval 127. At the end of that measured time period, AND gate 144 is enabled at its lower input, and if a horizontal component is present that AND gate 144 conducts. The conducting periods of AND gates 142, 144 are shown by curves 7B, D, respectively.

In greater detail, the major parts of the detector circuit are preferably a quartz crystal controlled clock pulse oscillator 140, a series of counters 141, 141A, 143, 143A, a decoding or count conversion and signal validation circuits 147, 147A, an accumulator circuit 148, and output circuit 149 for controlling the valve at 15, or 149A for performing an alternative function. The oscillator 140 may have a cyclic output waveform of any suitable wave shape, such as a sinusoidal wave or a series of pulses, for example. In either event, the waves or pulses form a series of positive or negative signals which may be counted at 141, 141A, 143, 143A, in either a decimal or binary form.

For example, assuming that the clock pulse oscillator 140 is operating at one megahertz, the counterstages 141, 143 provide counts in microseconds. The maximum width of these microsecond pulse intervals becomes the error factor which limits the accuracy. If less accuracy is required the count may be slowed, or for greater accuracy the count may be speeded. Any number of counterstages may be provided, as desired.

Assume, for example, that the interval between the output pulses from the tuned hammer (i.e., the time between pulses 125, 128) is a few seconds. The first counting circuit 141 is adjusted to count the number of output signals from clock 140 which occur within those few seconds. When each count sequence ends, such a period of time has elapsed, and an output signal from counter 141 appears at the lower input of AND gate 142, to enable it to operate. If the line 150 is also marked at this time, responsive to a signal picked up by the geophone 102, the AND gate 142 conducts and provides an output signal to the signal validation circuit 147.

Also, the counter 141 triggers the transmission of a pulse over wire 151 to start counter 143, which thereafter counts clock pulses received over the wire 152, until it has measured a period of time equal to the time period 127.

Hence, after each count is completed by the counter 141, the counter 143 counts a predetermined number of clock pulses corresponding to the time interval 127. Then, it sends an enable pulse to the lower input of the AND gate 144. If the horizontal geophone 103 is then detecting a sonic energy pulse, the wire 153 is then marked. The AND gate 144 conducts and sends an output signal to the validation circuit 147.

If should now be apparent that the signal validation circuit 147 receives the stream of gate pulses (FIG. 7B) from the AND gate 142, and the stream of gate pulses (FIG. 7D) from the AND gate 144, each pulse in the first stream being separated from a corresponding pulse in the other stream by a time period 127. Accordingly, the validation circuit 147 recognizes each two such successive pulses (one pulse from each stream) as an apparently valid signal indicating receipt of sonic energy sent from the tuned hammer 100. Responsive to each apparently valid pair of pulses, a signal is sent from validation circuit 147 to the accumulator circuit 148, which may be a simple counter. After a sufficient number of apparently valid signals have been counted, the valve 15 is signalled to open or to remain open.

As long as the sonic energy signals continue to arrive, the accumulator 148 signals the valve 15 to remain open. However, when the sonic energy signals are no longer received, the accumulator 148 does not signal the valve 15, and its internal spring bias snaps it shut.

According to the inventive system, the driver or timer 30 may be adapted to send sonic energy pulses down the tubing, at different sonic pulse repetition rates. Thus, the spacing between pulses 125, 128, 129 in FIG. 7A may be transmitted, as shown, in order to hold open the valve 15; or, if the transmitting transducer 21 is driven at a different rate, pulses 125, 128, 129 may be spaced either further apart, or closer together, and some other function may be provided.

Thus, for example, a different set of AND gates 142A, 144A may respond to a count of fewer pulses (as compared to the counts at 141, 143) by the counters 141A, 143A in order to detect sonic energy pulses which recur at a faster fixed pulse repetition rate. Still other and similar sets of AND gates (not shown) may respond to a greater or other count, in order to detect sonic energy pulses at a slower or other repetition rate. Thus, the system may be adapted to respond in any suitable number of different ways depending upon a selection of the sonic pulse repetition rate of the received sonic energy pulses.

According to the invention, any of several different and independently commanded functions may be provided at the bottom of a well. For example, one sonic pulse repetition rate may be used to repeatedly command the valve 15 to remain open so that it slams shut under the force of its spring bias, if the sonic energy terminates. Another and different sonic pulse repetition rate may be used to command the valve to lock open so that there is no effect if the sonic energy should thereafter terminate. This way, the sonic energy can be terminated briefly while the system is being serviced, repaired or replaced. In a similar manner, any of many other functions may also be performed, depending upon the sonic pulse repetition rate of energy transmitted down the well tubing. Accordingly, any suitable downhole function may be provided.

With any embodiment of the invention, a motor control switch 80 (FIG. 5) may also be provided for driving a motor 81 to close a valve via a gear train 82. Limit switches 83 may be built into the system so that it knows whether the valve is opened or closed. This conserves the power of batteries in a power source 84, at the bottom of the well. A suitable low power signal may close the valve whenever the power supply 84 approaches exhaustion.

The tubing and associated equipment used in the inventive communication system are shown in FIG. 8. The major assemblies in this FIG. 8 are a driver or timer 30, an exciter 200, tubing 13, a side pocket mandrel 201, an electrical to hydraulic converter or a hydraulic unit 202, and the disaster valve 15. Below these assemblies, the tubing 13A may extend any suitable distance further through the oil or gas well. Any of the above described transmitters (FIGS. 2, 2A, 6) may be used to generate pulses of sonic energy for transmission down the tubing walls.

The sonic energy transmission through the tube line system (FIG. 8) begins with operation of an exciter 200, which is here assumed to include the nickel rods 17–20 of FIG. 2, or any of the other devices seen elsewhere in the drawings. The exciter 200 is shown in FIG. 8 as being included within the tubing string 13; however, it may also be provided on the flange 25 at the top of the tubing, as seen in FIG. 2.

As the production tubing is lowered into the tube casing, it should be centered so that it does not rub or rest against the casing and thereby damp the sonic energy transmission. Also, the tubing should be restrained from migrating into intermittent contact with the well casing during operation. For this reason, a series of resilient collars or toroids 210, 211, 212 . . . are positioned over the tubing to space and hold the tubing away from the well casing. These collars or toroids are shaped and proportioned to substantially fill all space between the tubing and casing. Preferably, these collars or toroids are spaced at intervals, such as 100–150 feet, with approximately 120 feet preferred in straight wells, and closer intervals preferred in crooked or deviated wells. These collars or toroids are conventional devices, available from the Regal Rubber Co. of Corsicana, Tex.

The tubing may extend any suitable and indefinite distance downwardly into the well. Very often the depth may be in the order of one to four thousand feet. However, both deeper and shallower wells are also known.

Toward the bottom of the well, the tubing 13 has a side pocket mandrel 201, which is a receptacle for a battery, electronics, and other serviceable or replaceable components in module 214. The mandrel is arranged so that a wire running tool 125 may be used to lower or raise these components without having to pull the entire tubing string out of the well.

The nature and construction of the side pocket mandrel is best seen in FIG. 9. The tubing line 13 extends straight through the mandrel, without any substantial interruption. An upper end fairing 220 is welded to tubing 13, where it tapers and spreads the outside contours from the diameter of the tubing 13 to the diameter of the side pocket mandrel 201. Below the fairing, the outside contours of the mandrel are generally cylindrical. A lower fairing 221 tapers and reduces the diameter of the mandrel to the diameter of the tubing 13, when it is welded in place.

Inside the mandrel, an index plate 222 is set at an angle to guide and direct a solid object (such as electronics module 214) sliding through tubing 13 into a side pocket 224 inside the mandrel. As seen in FIGS. 10–12, the mandrel is internally shaped at 223 to lead the solid object from tubing 13 and into side pocket 224, where it drops into a landing or a resting position.

At the bottom of the landing or resting position, there is a female connector 225 which is engaged by mating connectors on the solid object. The contacts are completed by a stabbing motion when the solid object finally drops in place. This female connector 225 may be a series of spaced, parallel, vertically disposed ring contacts 226–229, so that alignment is no problem. These connectors are sealed from the oil by rubber encapsulated female connectors (not shown). The rubber seal is penetrated by the mating connector, without admitting oil, as the solid object drops into its final position. Also, since the seal is maintained between the mating connectors at the time when the electrical circuit is completed, any sparks are snuffed out. However, there should not be any sparks since the voltage is very low. Connectors of this type are available from the Electro-Oceanics Company in Paramont, Calif.

Thus, the module or solid object 214 may be removed by pulling a wire attached to it and may be installed by dropping it down the tubing. The module or solid object 214 generally contains consumable times, such as batteries, and repairable or replaceable items, such as electronics.

FIG. 13 shows the general principle of the module landing in the side pocket 224 in the mandrel 201. Inside the upper end of the side pocket mandrel 224 is a recessed groove 230 which serves as a keeper for latches 232 and a shoulder for limiting downward motion of the electronics module 214. The upper end of module 214 has a neck or stem 231 or reduced cross section so that it may be seized by the wire running tool 215. Mounted on stem 231 is a pair of spring biased latches 232 which are guided by a cam surface 233, at the upper edges of side pocket 224, leading into the groove 230, where the latches snap into a locked position. The tops 235 of the latches 232 are flat and form stops for engaging shoulders 236 and for thereby limiting the downward motion of the module 214. A groove 237 surrounds the neck 231 and provides an anchor point for attachment to wire running tool 215, for pulling the module 214 up the tubing.

The upper ends 238 of the latches 232 and the upper edge of groove 230 are tapered to form mutual guides, which direct the latches out of their capture position in the groove 230, when the module 214 is pulled up the tubing.

Accordingly, the wire running tool 215 (FIG. 8) may be lowered through the tubing to the guide plate 222, where it is guided into the side pocket 224, by the same contours that guide and direct the module 214 into the side pocket. The wire running tool 215 latches into groove 237 to capture and seize the mandrel 214 and to pull it up the tube. On lowering, the module falls into the side pocket, and the wire running tool 215 is unlatched, after the module has landed, and then the running tool may be withdrawn from the tubing.

The contacts 226-229 (FIG. 9) are attached within the side pocket mandrel to a cable 240 leading to a hydraulic unit 202 (FIG. 8). There, electrical signals developed by equipment in the module are converted into corresponding hydraulic pressure signals. These pressure signals are transmitted through a hydraulic line 241 to a suitable ball valve 15. The details of ball valve 15 are shown in U.S. Pat. No. 3,901,315, entitled "Downhole Valve", William H. Parker and Edmond I. Bailey, inventors.

This valve 15 comprises a rolling ball 245 which may roll up or down a cylinder 246. When the ball is at the top of cylinder 246, the tubing 13 is sealed shut. When it is at the bottom of the cylinder, the tubing 13 is open so that oil or gas may flow from the well up the tubing 13. A spring 247 is provided to urge the ball 245 upwardly to a normally closed position. When the sonic energy signal is received, the hydraulic pressure in line 241 forces the ball 245 downwardly against the bias of the spring 247, to an off-normal open position. As long as sonic energy continues to be transmitted from exciter 200, down tubing 13 to the electronics module 214, hydraulic unit 202 will supply pressure to force ball 245 downwardly against the bias of spring 247, thereby opening the valve.

A moment's reflection will reveal many of the advantages of the invention. There is immunity from noise, and no dependence upon extra ducts or transmission lines extending down the well. The transmission line is the wall of the tubing which carries the oil or gas. Thus, the valve control signal transmission line is as reliable as the pipe which carries the oil or gas. If any disaster should sever communications down into the well, the valve closes.

Those who are skilled in the art will readily perceive other modifications. Therefore, the appended claims are to be construed to cover all equivalent structures which fall within the true scope and spirit of the invention.

I claim:

1. A system for communicating into deep wells comprising a tubing extending from a point near the surface of the earth downwardly to remote points, signaling means attached to said tubing near the upper end thereof and operating upon the upper portion of said tubing for selectively exciting with sonic energy the tubing wall which acts as a sonic energy transmission line extending from said exciter means to said remote point, remotely controlled means near the remote point for performing at least one desired function, detection means associated with the tubing for detecting said sonic energy when transmitted through the transmission line formed along the length of the tubing wall, means responsive to said detection means for converting said sonic energy transmitted through said line into mechanically effective signals for controlling said remotely controlled means, and means for applying said converted signals to said remotely controlled means.

2. The system of claim 1 wherein said exciter means transmits said sonic energy continuously down said tube wall, said remotely controlled means responds to an absence of said sonic energy, and said means for applying converted signals enables said remotely controlled means to operate responsive to the termination of said sonic energy, regardless of whether the tubing wall continues to exist as a viable sonic energy transmission media.

3. A system for communicating into deep wells comprising a tubing extending from a point near the surface of the earth downwardly to a remote point, exciter means attached to said tubing near the surface of the earth for selectively exciting the tubing wall with sonic energy and continuously transmitting said energy down said tube wall, remotely controlled means near said remote point and responsive to an absence of said sonic energy for performing at least one desired function, detection means associated with the tubing for detecting said sonic energy when transmitted through the tubing wall, means responsive to said detection means for converting said sonic energy into mechanically effective signals for controlling said remotely controlled means, means for applying said converted signals to said remotely controlled means to enable it to operate responsive to termination of said sonic energy, regardless of whether the tubing wall continues to exist as a viable sonic energy transmission media, said tubing including side pocket mandrel means forming a support for consumable or replaceable components used in said system, and means in said mandrel for enabling said components to be removed from said well by pulling them up said tubing and for enabling said components to be installed by lowering them down said tubing.

4. The system of claim 3 wherein said consumable or replaceable components include a battery and electronic components for responding to the receipt of sonic energy transmitted through said tubing wall.

5. The system of claim 4 wherein said converter means comprises a hydraulic pressure control means operated responsive to signals received from said electronic components.

6. The system of claim 5 wherein said remotely controlled means comprises a valve in said tubing and means for selectively operating said valve responsive to changes in said hydraulic pressure.

7. The system of claim 6 wherein said valve is a ball valve.

8. A system for communicating into deep wells comprising a tubing extending from a point near the surface of the earth downwardly to a remote point, exciter means attached to said tubing near the surface of the earth for selectively exciting the tubing wall with sonic energy and continuously transmitting said energy down said tube wall, remotely controlled means near said remote point and responsive to an absence of said sonic energy for performing at least one desired function, detection means associated with the tubing for detecting said sonic energy when transmitted through the tubing wall, means responsive to said detection means for converting said sonic energy into mechanically effective signals for controlling said remotely controlled means, means for applying said converted signals to said remotely controlled means to enable it to operate responsive to termination of said sonic energy, regardless of whether the tubing wall continues to exist as a viable sonic energy transmission media, and driver means for selectively operating said exciter means to interrupt said sonic energy at any one of many different pulse repetition rates, said detection means giving distinctive output signals corresponding to the repetition rate at which said exciter means is then operating.

9. A system for communicating into deep wells comprising a tubing extending from a point near the surface of the earth downwardly to remote points, exciter means near the surface end of said tubing for selectively exciting the tubing wall with sonic energy, driver means for selectively operating said exciter means at any one of many different pulse repetition rates, remotely controlled means near the remote point for performing at least one desired function, detection means associated with the tubing for detecting said sonic energy when transmitted through the tubing wall, said detection means giving distinctive output signals corresponding to the repetition rate at which said exciter means is then operating, means responsive to said detection means for converting said sonic energy into mechanically effective signals for controlling said remotely controlled means, means for applying said converted signals to said remotely controlled means, wherein said remotely controlled device is a valve for opening or closing said tubing, means responsive to operation of said exciting means at one repetition rate for holding said valve open against a spring bias, whereby said valve shuts under the urging of said spring bias if said exciting means stops, and means responsive to operation of said exciting means at another repetition rate for locking said valve open whereby said exciting means may be stopped without causing said valve to shut.

10. A tube line communication system extending from a first end over a substantial distance to a second end, said system comprising means attached to said tubing near said first end including a signal source for causing interruptions to recur at a predetermined pulse repetition rate, sonic energy generating means controlled responsive to said signal source for exciting the walls of said tube line at the point of attachment near said first end with sonic energy which is interrupted at said predetermined repetition rate, said walls of said tube line acting as a transmission line for conveying said sonic energy over said substantial distance to said second end, means at a remote point near the second end of said tube line for detecting said sonic energy which has been transmitted over said distance and through said tubing wall, and means responsive to said detection means for providing a remote function control at said second end responsive to detection of said sonic energy which is interrupted at the predetermined pulse repetition rate.

11. The system of claim 10 wherein said tube line comprises a tubing for conveying a substance normally moving through said tube line and a side pocket for receiving an object which does not normally move through said tube, but which may occasionally move in said tube, at least one part of said system being housed in said side pocket mandrel, and guide means in said mandrel for guiding and directing said object moving downwardly through said tube line into said side pocket.

12. The system of claim 11 wherein said side pocket includes a landing means having a shoulder for stopping the movement of said object, and latch means for securing said object in said landing.

13. The system in claim 12 wherein said side pocket and said object include mating electrical contacts which are closed responsive to a stabbing motion which occurs when said object stops in said landing.

14. The system of claim 13 wherein said object moves at least partially under the force of gravity as it drops into said side pocket.

15. The system of claim 14 and wire running tool means for selectively latching onto said object to move it through said tube and thereafter unlatching so that said tool may be removed while said object remains latched in said landing.

* * * * *

UNITED STATES PATENT OFFICE
CERTIFICATE OF CORRECTION

Patent No. 4,073,341           Dated February 14, 1978

Inventor(s) WILLIAM H. PARKER

It is certified that error appears in the above-identified patent and that said Letters Patent are hereby corrected as shown below:

Column 4, line 34, "prinicipal" should read --principal--.

Column 5, lines 59-60, "snychronizing" should read --synchronizing--.

Column 7, line 66, "elaspsed" should read --elapsed--.

Column 10, line 42, after "231", "or" should read --of--.

Column 11, lines 42-43, claim 1 - "signaling means" should read --signaling exciter means--.

Signed and Sealed this

Ninth Day of May 1978

[SEAL]

Attest:

RUTH C. MASON
Attesting Officer

LUTRELLE F. PARKER
Acting Commissioner of Patents and Trademarks